United States Patent [19]

Gebel et al.

[11] 3,942,253

[45] Mar. 9, 1976

[54] DEVICE FOR MEASURING DEVIATION OF THE NORMAL SECTION PROFILE OF A PART FROM THE ROUND SHAPE

[76] Inventors: Iosif Davydovich Gebel, Svetlanovsky prospekt, 35, kv. 94; Arkady Alexandrovich Zykov, prospekt Smirnova, 15, kv. 51; Askold Ivanovich Nefedov, Kolomyagi 2 Nikitinskaya ulitsa, 8, kv. 5; Viktor Ivanovich Parshikov, prospekt Karla Marxa, 70, kv. 93; Viktor Fedorovich Khrolenko, Zvezdnaya ulitsa, 18, kv. 110, all of Leningrad, U.S.S.R.

[22] Filed: May 3, 1974

[21] Appl. No.: 466,889

Related U.S. Application Data

[63] Continuation of Ser. No. 234,602, March 14, 1972, abandoned.

[52] U.S. Cl. .......................... 33/178 D; 33/174 PA
[51] Int. Cl.² ..................... G01B 5/20; G01B 5/28
[58] Field of Search ........ 33/174 R, 174 L, 174 PA, 33/174 Q, 178 R, 178 D, 178 E

[56] References Cited
UNITED STATES PATENTS

| | | | |
|---|---|---|---|
| 3,274,693 | 9/1966 | Witzke | 33/178 D |
| 3,795,055 | 3/1974 | Zucco | 33/174 Q |

FOREIGN PATENTS OR APPLICATIONS

| | | | |
|---|---|---|---|
| 1,944,605 | 5/1971 | Germany | 33/174 PA |
| 142,789 | 11/1953 | Sweden | 33/178 D |

*Primary Examiner*—Richard E. Aegerter
*Assistant Examiner*—Richard R. Stearns
*Attorney, Agent, or Firm*—Haseltine, Lake & Waters

[57] ABSTRACT

The device has a base mounting a support which constantly contacts a normal section profile of a part, being measured, the part having the shape of a body of revolution. The support is essentially a system of self-adjusting balance beams arranged in steps. The axles of oscillation of the beams of a first step are secured to the base, while the axles of oscillation in subsequent steps are secured to the respective ends of beams of a preceding step. The beams of a last step contact the profile being measured. The central angles under which the balance beams are mounted are chosen on the basis of the condition of maximal stabilization of the position of the centre of the profile of the part relative to the base in the direction of disposition of a sensing element of a linear-movement dial indicator secured to the base.

2 Claims, 13 Drawing Figures

DEVICE FOR MEASURING DEVIATION OF THE NORMAL SECTION PROFILE OF A PART FROM THE ROUND SHAPE

This application is a continuation of Ser. No. 234,602, now abandoned, filed on Mar. 14, 1972.

The present invention relates to the field of measuring techniques and, more particularly, to devices used for measuring the deviation from the round shape of a normal section profile of a part having the shape of a body of revolution.

It is most expedient to use the device made in accordance with the present invention for measuring the non-roundness of the races of antifriction bearings. Besides, it is also expedient to use this device for measuring the non-roundness of large-sized parts, such as calender shafts.

Devices for measuring the deviation of the normal section profile of a part having the shape of a body of revolution, comprising a base mounting a support which is essentially a V-shaped prism contacting at two points the part being measured, are well known. This base has a linear movement pick-up or indicator disposed thereon and having its sensing element contacting the profile of the part being measured.

The main disadvantage of such devices lies in an extremely low accuracy of measurement of the deviation of the normal section profile.

Besides, widely known in the art are devices used for measuring the deviation of the normal section profile of a part from a round shape of the "Talyrond" type, manufactured by the firm "Rank Taylor Hobson" (England).

This device comprises a precision measuring spindle mounting a linear movement indicator, the sensing element of the latter contacting the part profile being controlled. This device allows one to measure with high accuracy. The accuracy of measurements carried out with the aid of this device is ensured due to a high stability of the position of the axis of rotation of the spindle. The stability of the position of the axis is attained owing to a high precision of manufacture of all the parts of the spindle, which, in turn, makes such devices extremely costly and requires a high skill on the part of the personnel servicing them.

An object of the present invention is to provide a device for measuring the deviation of the normal section profile of a part from the round shape that ensures a high accuracy of measurements and is simple in design.

Another object of the present invention is to provide an economical device.

Still another object of the present invention is to raise the efficiency of the device.

These and other objects of the present invention are accomplished in the inventive device for measuring the deviation from the round shape of a normal section profile of a part having the shape of a body of revolution from the round shape, comprising a support disposed on a base and constantly contacting the normal section profile of a part in the course of revolution of the latter, and a linear movement dial indicator whose sensing element contacts the profile of the part, in which, according to the present invention, the support is essentially a system of self-adjusting balance beams arranged in steps, of which a first step has a pair of balance beams with axles of oscillation secured to the base and carrying on their end portions axles of oscillation of beams of a subsequent step, and the beams of a last step have portions adapted to contact the normal profile of the workpiece. The disposition of the axle of oscillation of each balance beam of a subsequent step on the balance beam of a preceding step is determined by a central angle confined by radii drawn from the centre of the relative rotation of the part to the axles of oscillation of these balance beams, and the disposition of the portion of contact of each balance beam of the last step with the profile of the part is determined by a central angle confined by radii drawn from the centre of the relative rotation of the part to the axle of oscillation of the balance beam and to the centre of the contact portion. All the central angles are chosen on the basis of the condition of the maximal stabilization of the position of the centre of the measured profile of the section of the part relative to the base in the direction of the disposition of the sensing element of the dial indicator.

In case the balance beams of all the steps are made symmetrical relative to their axles of oscillation and the axles of oscillations of the balance beams of all the preceding steps, and the sensing element of the indicator contacts the profile at a point disposed on an X axis drawn perpendicular relative to an imaginary line connecting the axles of oscillations of the balance beams of the first step through the normal position of the centre of the measured part profile. The axes X and Y (the latter to be mentioned somewhat later) will be explained in detail as the description progresses with reference to the accompanying drawings.

It is expedient to find the central angles on the basis of the condition of minimizing the expression $$P_{xn} = \left| \frac{\cos n\mu_0}{\cos \mu_0} - \prod_{i=1}^{i=k} \frac{\cos n\mu_i}{\cos \mu_i} \right|,$$

wherein:

$P_{xn}$ is a value determining the amplitude of the harmonic n of displacement of the centre of the profile to the axis X;

n is a serial number of harmonics n = 2; 3; 4; ...

$\mu_o$ is a central angle defined by radii drawn from the the centre of rotation of the part to the axle of oscillation of one balance beam of the first step and to the centre of the portion interconnecting the axles of oscillation of the balance beams of the first step;

i is a serial number of a step of the self-adjusting supports $1 \leq i \leq k$;

$\mu_i$ is a central angle defined by radii drawn through the axles of oscillation of one balance beam of step i and one balance beam of step i+1, mounted thereon, or, in case i=k, through the centre of the area of contact of the balance beam of the last step with the part and the axle of oscillation of the balance beam;

$$\prod_{i=1}^{i=k}$$

is a symbol standing for the product of the cofactors ranging from i=1 to i=k.

In a similar case in which however the sensing element of the indicator contacts the profile at a point disposed on a Y axis drawn parallel to the portion connecting the axles of oscillation of the balance beams of the first step. Otherwise, as explained just before, the following alternative expression can be used:

$$P_{vn} = \left| \frac{\sin n\mu_0}{\sin \mu_0} \prod_{i=1}^{i=k} \frac{\cos n\mu_i}{\cos \mu_i} \right|,$$

wherein:

$P_{vn}$ is a value determining the amplitude of the harmonic n of displacement of the centre of the profile to the axis Y, all other parameters being substantially as explained before.

The disposition of the balance beams at predetermined angles chosen on the basis of the condition of minimizing the afore-given expressions provides for a high stability of the axis of rotation of the part in the direction of disposition of the sensing element of the linear movement dial indicator.

In case the device is used for measuring the distance between the centre of the normal section of the part and the axis of its rotation, it is expedient to suspend the base carrying the self-adjusting balance beams to a pantograph, and to include an additional dial indicator disposed in such a manner that its sensing element contacts a flat area of the base in the direction perpendicular to the translational displacement of the base.

With the base disposed on the pantograph and the additional indicator employed, it is possible to measure simultaneously the deviation of the normal section profile of a part from the round shape and the distance between the centre of the normal section of the part and its actual axis of rotation (beating).

The device built in accordance with the present invention provides for a high accuracy of measurements and is simple in design. Besides, this device does not require a high skill on the part of the operating and servicing personnel and can be installed in workshops producing parts that are to be controlled.

The following description of preferred exemplary embodiments of the present invention is given with reference to the accompanying drawings, in which.

A first exemplary device for measuring the deviation of the normal section profile of a shaft 1 (FIGS. 1, 2) from the round shape comprises a base 2 mounting a support 3 which is essentially composed of self-adjusting balance beams 4 and 5 arranged in steps. The balance beams 4 form a first step of the support, their axles 6 of oscillation being secured to the base 2. Secured to the end portions of the beams 4 of the first step are axles 7 of oscillation of the balance beams 5 forming a second step of the support.

The balance beams 5 of the second step have portions 8 (FIG. 3) by which they contact the profile of the shaft 1, being measured. In a particular case a point contact is possible, i.e. when the areas of contact have no lengths. The base 2 mounts a linear-movement pickup 9 or dial indicator (FIGS. 1, 2) disposed symmetrically relative to the axles 6 of oscillation of the balance beams 4. A sensing element 10, herein after called a feeler of the indicator touches the profile of the shaft 1, which is to be measured.

Figure 1:
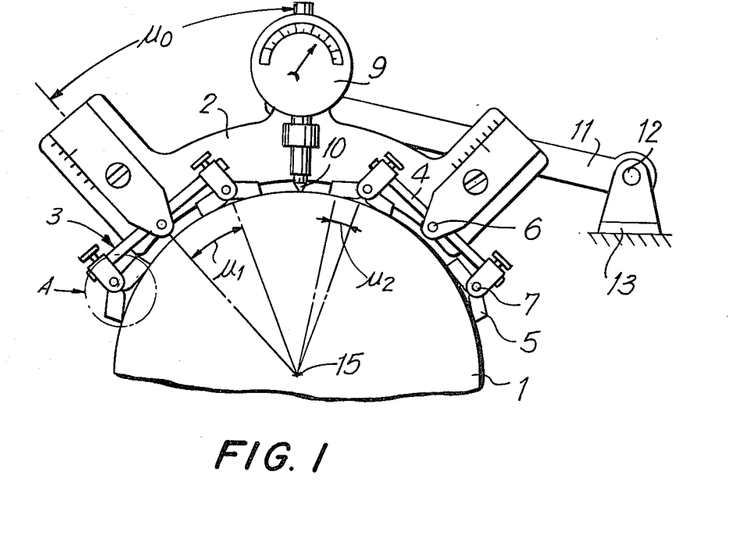
FIG. 1 shows the inventive device for measuring the deviation of the normal section profile of a shaft from the round shape, in a front view.
Figure 2:
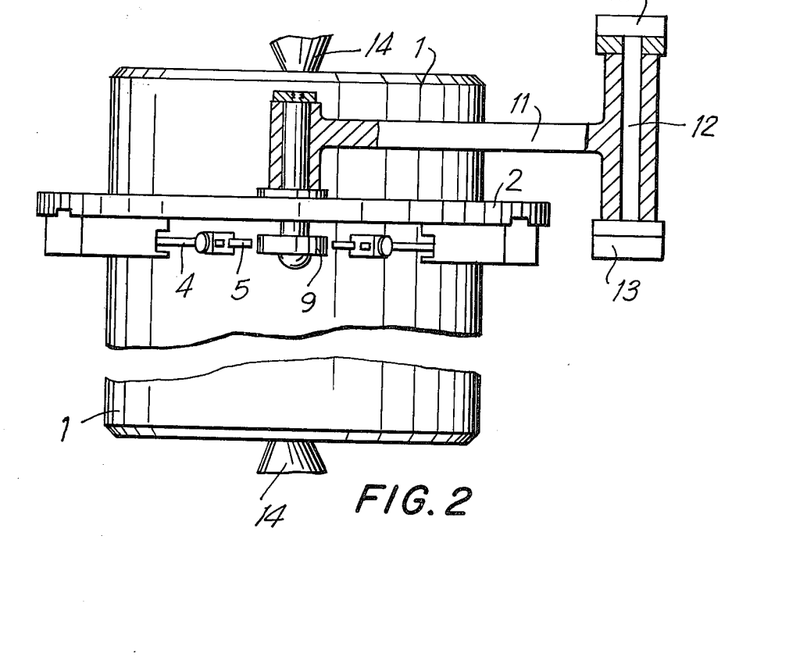
FIG. 2 shows the same device in a top view.

The base 2 is pivoted to the end portion of a lever II whose axle 12 is secured in a bracket 13.

The lever 11 is used to fix the position of the base 2 relative to the profile being measured. The constant contact of the balance beams 5 of the last step with the profile being measured is ensured by the force of the weight of the balance beams 4, 5 and the base 2.

In order to press the balance beams 5 against the shaft I, a spring or any other elastic member may be used.

The shaft 1 is mounted in centres 14 and is rotated by a drive that is not shown for simplification reasons.

The position of the axle 6 of oscillation of each balance beam 4 of the first step is determined by a central angle $\mu_0$ confined by radii drawn from a centre 15 of the section profile of the shaft 1 to the axle 6 and to the centre of the portion connecting the axles 6 of oscillations of the two balance beams 4 of the first step.

The position of the axle 7 of oscillation of each balance beam 5 of the second step is determined by a central angle $\mu_1$ confined by radii drawn from the centre 15 of the section profile of the shaft 1 to the axles 6 and 7.

The position of each contact area 8 of each balance beam 5 of the second step with the measured section profile of the shaft 1 is determined by a central angle $\mu_2$ confined by radii drawn from the centre 15 of the section profile of the shaft 1 to the axle 7 of oscillation of the balance beam and to the centre of said portion of contact.

The position of the feeler 10 of the linear movement pick-up 9 is determined by an angle $\alpha$ (FIG. 4) confined by radii drawn from the centre 15 of the section profile of the shaft 1 to the feeler 10 and to the centre of an imaginary portion connecting the axles 6 of oscillation of the balance beams of the first step.

In the device shown in FIG. 1 the angle $\alpha$ equals zero, as the feeler 10 is disposed on the radius passing through the centre of the portion interconnecting the axles 6 of oscillation.

For the cases when $\alpha = 0°$ or $180°$, the central angles $\mu_0$, $\mu_1$, and $\mu_2$ are chosen on the basis of the condition of maximal stabilization of the position of the centre 15 of the measured section profile of the shaft 1 relative to the base 2 in the direction of the feeler 10 disposition.

The minimum of the following expression corresponds to the condition of the maximal stabilization of the centre 15 of the measured section profile of the shaft 1 relative to the base 2 in the direction $\alpha = 0°$ or $180°$;

$$P_{xn} = \left| \frac{\cos n\mu_0}{\cos \mu_0} \cdot \frac{\cos n\mu_1}{\cos \mu_1} \cdot \frac{\cos n\mu_2}{\cos \mu_2} \right|,$$

wherein:

$P_{xn}$ is a value determining the amplitude of the harmonic n of displacement of the centre of the profile to a segment OX (FIG. 4) of an X axis;

n is a serial number of harmonics n=2; 3; 4; ...

In case the feeler 10 of the indicator touches the measured section profile of the shaft 1 at a point disposed on a radius parallel to an imaginary portion interconnecting the axles 6 of oscillation of the balance beams 4 of the first step ($\alpha = \pm 90°$), the central angles $\mu_0$, $\mu_1$, $\mu_2$ are chosen on the basis of the condition of the maximal stabilization of the position of the centre 15 of the measured section profile of the shaft 1 relative to the base 2 in the direction of the disposition of the feeler 10, characterized by angles $\alpha = \pm 90°$.

The minimum of the following expression corresponds to the condition of the maximal stabilization of the position of the centre 15 of the measured section profile of the shaft 1 relative to the base 2 in the direction $\alpha = \pm 90°$:

$$P_{yn} = \left| \frac{\sin n\mu_0}{\sin \mu_0} \cdot \frac{\cos n\mu_1}{\cos \mu_1} \cdot \frac{\cos n\mu_2}{\cos \mu_2} \right|,$$

wherein:

$P_{yn}$ is a value determining the amplitude of the harmonic n of displacement of the centre of the profile to a segment axis OY (FIG. 4) of a Y axis.

Figure 4:
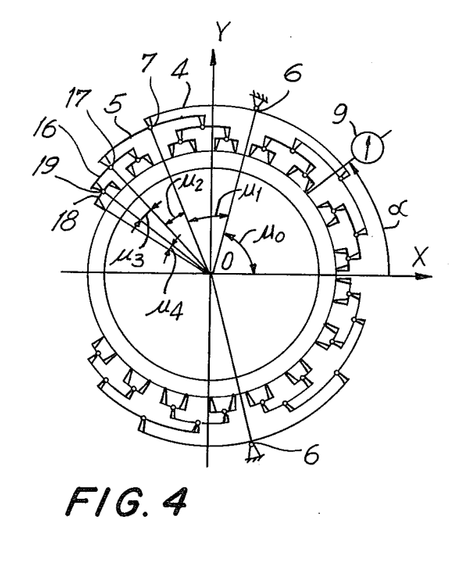
FIG. 4 shows schematically a symmetrical disposition of balance beams relative to their axles and the axles of the balance beams of a preceding step, and the position of the linear movement indicator.

It will be seen from FIG. 4 that the X axis is drawn substantially horizontally while the Y axis, both having been mentioned before, is perpendicular or vertical, as shown. These axes constitute straight lines passing through the center positions 0 in the various exemplary embodiments of the inventive device.

All the other designations or parameters have been explained before.

In order to increase the accuracy of the measurement of the deviation of the controlled normal section profile of a part from the round shape, it is possible to increase the number of steps of the self-adjusting balance beams.

FIG. 4 shows a four-step support. Balance beams 16 of a third step are mounted on axles 17 of oscillation, that are secured to the end portions of the balance beams 5 of the second step.

Balance beams 18 of the fourth step of the support are mounted on axles 19 of oscillation, which are secured to the end portions of the balance beams 16 of the third step, i.e. the oscillation axles of the balance beams of a subsequent step are secured to the end portions of the balance beams of a preceding step.

Central angles $\mu_3$ and $\mu_4$ characterizing the disposition of the axles 17 and 19 of oscillation, respectively, of the balance beams 16, 18 and the areas of contact of the balance beams 18 of the fourth step and the measured profile of the part are determined by corresponding radii in a manner analogous to the afore-cited example.

In the general case if the step number $i$ of the support equals $1 \leq i \leq k$; and $\alpha = 0°$ or $180°$, the values of the angles $\mu_i$ are chosen on the basis of the condition of minimizing the value $$P_{xn} = \left| \frac{\cos n\mu_0}{\cos \mu_0} \prod_{i=1}^{i=k} \frac{\cos n\mu_i}{\cos \mu_i} \right|,$$

If the feeler 10 of the pick-up 9 touches the measured profile at points corresponding to the angles $\alpha = \pm \pi/2$, the values of the angles $\mu_i$ ($0 \leq i \leq k$) are chosen on the basis of the condition of minimizing the value $$P_{yn} = \left| \frac{\sin n\mu_0}{\sin \mu_0} \prod_{i=1}^{i=k} \frac{\cos n\mu_i}{\cos \mu_i} \right|$$

With $\alpha = 0°$ or $180°$, the angles $\mu_0 = 39°$; $\mu_1 = 20°$; $\mu_2 = 10°$ approximately minimize the value $P_{xn}$ and provide, in a device employing a two-step support, a cophasal measurement of the amplitudes of harmonics of the Fourier's series of the profile being tested the serial numbers $2, \leq n \leq 14$ with an error not exceeding 25%.

With $\alpha = 0°$ or $180°$, the angles $\mu_0 = 39°$, $\mu_1 = 20°$; $\mu_2 = 10°$; $\mu_3 = 5°$ minimize the value $P_{xn}$ and provide, in a device employing a three-step support, a cophasal measurement of the amplitudes of harmonics of the Fourier's series of the profile with the serial numbers $2 \leq n \leq 25$ with an error not exceeding 25%.

With $\alpha = \pm 90°$, the angles $\mu_0 = 75°$; $\mu_1 = 39°$; $\mu_2 = 20°$ $\mu_3 = 10°$; $\mu_4 = 5°$ minimize the value $P_{yn}$ and provide, in a device employing a four-step support, a cophasal measurement of the amplitudes of harmonics of the Fourier's series of the profile with the serial numbers $2 \leq n \leq 25$ with an error not exceeding 8%, except for the third harmonic for which the error of measurements equals 17%.

Figure 5:
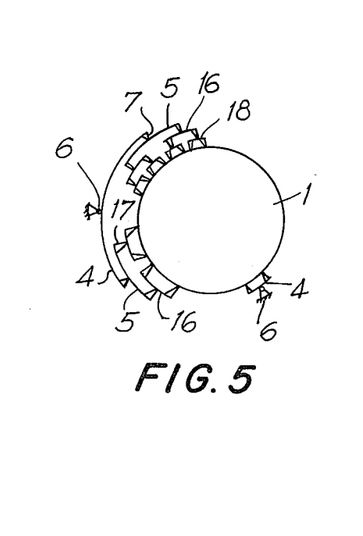
FIG. 5 shows schematically an asymmetrical disposition of the balance beams.

It is also possible to mount the balance beams 4, 5, 16, 18 in a non-symmetrical manner, as is shown in FIG. 5.

Another exemplary device for measuring the deviation of the profile of the external surface of a ring 20 (FIGS. 6, 7) from the round shape, comprises a frame 21 mounting a spindle 22. One end portion of the spindle 22 is connected by means of a pinion drive 23 with an electric motor 24, while the other end portion of the spindle has a table 25 secured thereon and used for mounting the ring 20 to be measured. The ring 20 is fixed on the table 25 by means of stops 26.

Secured to the frame 21 is an axle 27 mounting a lever 28 pivoted to a base 29 in a manner analogous to that in which the base 2 (FIGS. 1, 2) is connected to the lever 11.

Disposed on the base 19 (FIGS. 6, 7) is a support 30 which is essentially constituted by balance beams 31 and 32 arranged in steps, and which belong to the first and second steps, respectively. The balance beams are interconnected and mutually disposed in a manner analogous to that in the device for measuring the section profile of the shaft 1 (FIGS. 1, 2).

Figure 6:
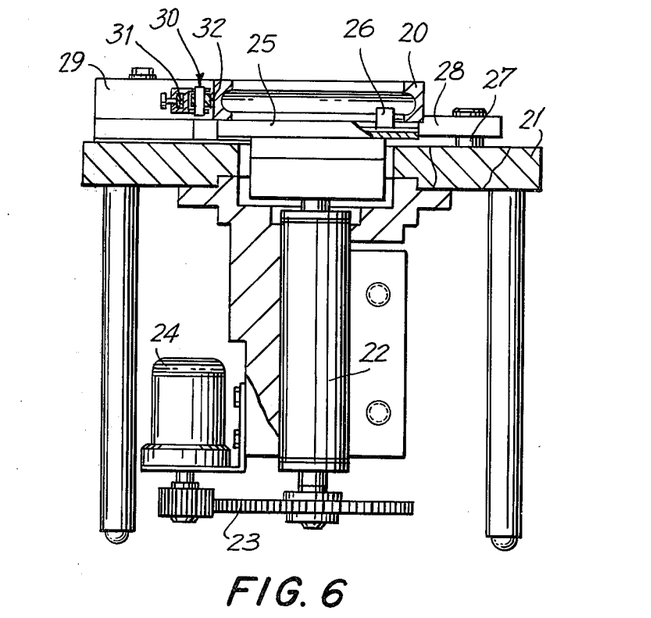
FIG. 6 shows another inventive device for measuring the deviation of the normal section profile of an external surface of a ring from the round shape, in a longitudinal section.
Figure 7:
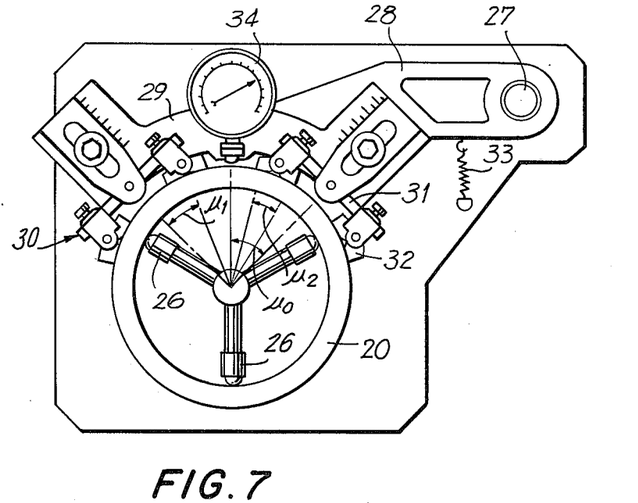
FIG. 7 is the same device in a top view.

The constant contact of the balance 32 of the last step of the support is ensured by means of a spring 33 whose one end portion is secured to the lever 28 and the other end portion to the frame 21.

A linear movement indicator 34 is disposed on the base 29, and its feeler 35 contacts the measured profile of the ring 20.

The central angles $\mu_o$, $\mu_1$ and $\mu_2$ are found analogously to the afore-described manner, depending on the angle $\alpha$ determining the position of the indicator 34 relative to the support 30.

Figure 8:
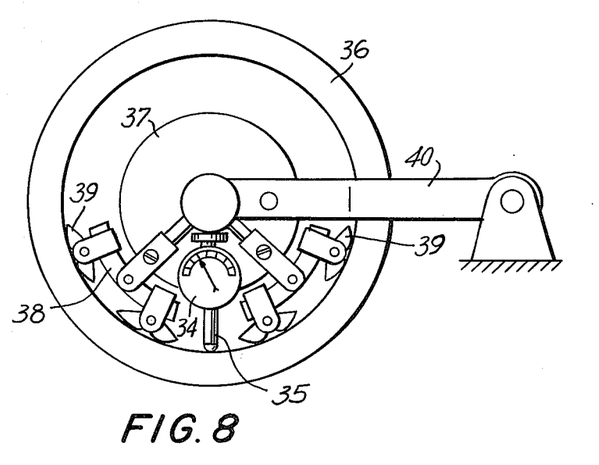
FIG. 8 is yet another inventive device for measuring the deviation of the normal section profile of a hole of a part from the round shape.

In order to measure the deviation of the normal section profile of the internal surface of a ring 36 (FIG. 8), or some other part having a round hole from the round shape, in yet another exemplary inventive device a base 37 and balance beams 38 and 39 mounted thereon are disposed on a lever 40 cantileverly so that the base 37 can be introduced into the hole being measured.

In order to measure simultaneously the deviation of the normal section profile of a shaft 41 (FIG. 9) from the round shape and the distance between the centre 0 of the measured profile of the shaft 41 and the axis $0_1$ of rotation of the shaft, in a still further exemplary device a base 42 and balance beams 43 and 44 mounted thereon are suspended to a pantograph 45 secured to a frame 46.

Figure 9:
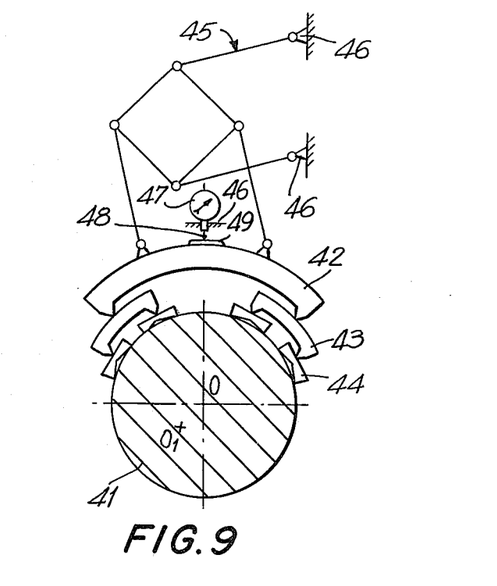
FIG. 9 shows a still further inventive device for measuring the distance between the geometrical centre of the normal section of a part and its axis of rotation (beating)

In order to measure the distance between the centre 0 of the measured profile from the axis $0_1$ of rotation of the shaft 41, an additional pick-up or dial indicator 47 is mounted on the frame 46, its feeler 48 touching the base 42 for which purpose the latter is provided with a flat portion 49.

The indicator 47 is mounted so that the feeler 48 always displaces perpendicularly to the portion, which provides for the measurement of the deviation of the centre 0 of the measured profile from the axis $0_1$ of rotation of the shaft 41.

The indicator measuring the deviation of the section profile of the shaft 41 from the round shape is not shown in FIG. 9 as it is installed in a manner analogous to that used in the afore-cited examples.

Figure 10:
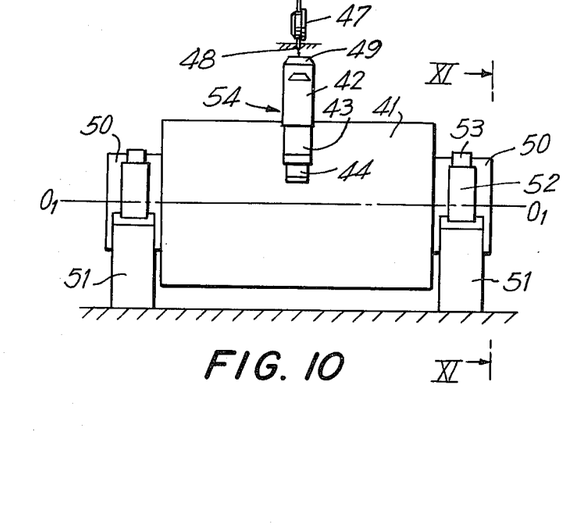
FIG. 10 is a final exemplary inventive device for measuring the beating of the controlled surface of a shaft relative to journals whose cylindrical surfaces serve as base surfaces.
Figure 11:
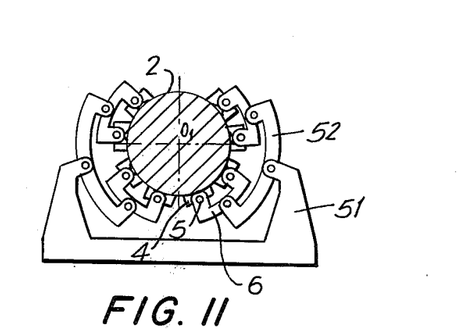
FIG. 11 is a section taken along line X1—X1 in FIG. 10.

Finally, the invention provides a final exemplary device to measure the deviation of the centre 0 of the measured profile of the shaft 41 relative to the axis passing through the centres $0_1$ of the sections of the profile of the base surfaces which are essentially the surfaces of journals 50 (FIGS 10, 11). The latter are mounted on a support which is essentially composed of self-adjusting balance beams 52, 53 mounted on a base 51 and arranged in steps. A device 54 analogous to the one that has been described before and shown in FIG. 9 is mounted on the controlled profile of the section of the shaft 41.

The device for measuring the deviation from the round shape can also be used for finding the centre 0 (FIG. 12) of the profile of a part 55. For this purpose a rule 59 is secured to a base 56 mounting balance beams 57 and 58 instead of the dial indicator.

Figure 12:
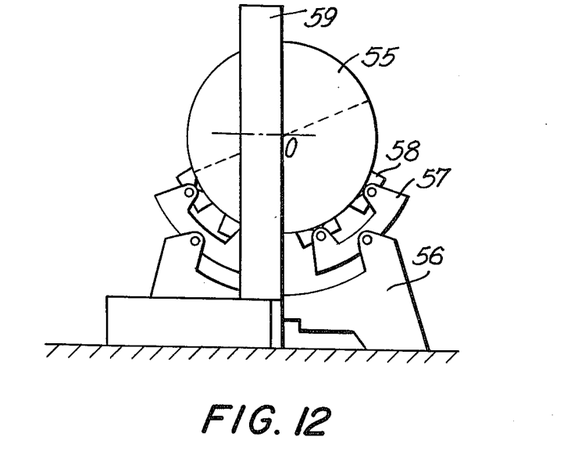
FIG. 12 is a device used for finding the centre of the normal section of the part (a centre searcher)

In order to find the centre 0 of the profile of the part 55, for instance a forged piece, the latter is placed on the balance beams 57 in an arbitrary position. A line is drawn along the rule 59, and then the part 55 is turned through a certain angle, for instance 90°, and a second line is drawn in this position. The intersection of the lines shows the approximate position of the centre 0 of the profile of the part 55.

The inventive device, for measuring the deviation from the round shape of a normal section profile of a part, having the shape of a body of revolution, functions as follows. The shaft being measured (FIGS. 1, 2, 3) is imparted rotation. The base 2 and the balance beams 4 and 5 mounted thereon are lowered onto the shaft until the portions 8 of the balance beams 5 contact the measured profile of the section of the shaft 1, whereby the feeler 10 of the linear movement pick-up 9 touches the profile being measured.

Figure 3:
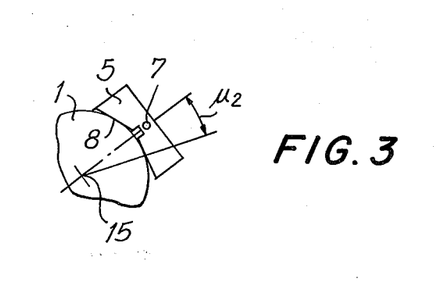
FIG. 3 is a unit A of FIG. 1, in an enlarged view.

With the shaft 1 rotating, the balance beams 5 slide by their portions 8 along the profile being measured, which has microscopic recesses and lugs determining its deviation from the round shape.

The recesses and lugs of the profile of the shaft 1 cause oscillations of the balance beams 4 and 5 about the axles 6 and 7. These oscillations ensure a constant contact of all the portions 8 of the balance beams 5 with the profile of the section of the shaft.

With the axles 6, 7 of oscillation of the balance beams 4, 5 mounted at the corresponding angles $\mu_o$, $\mu_1$ and $\mu_2$, there is provided a maximal stabilization of the distance from the centre 15 of the measured profile of the section of the shaft 1 and the point at which the indicator 9 is secured to the base 2, irrespective of the non-roundness of the measured profile.

Stabilization of this distance provides for a high accuracy of measurement of the deviation from the round shape of the tested profile.

When measuring the deviation of the profile of the ring 20 (FIGS. 6, 7) from the round shape, the former is disposed on the table 25 which is rotated by the motor 24 through the intermediary of the pinion drive 23 and the spindle 22. Then, the base 29 and the balance beams 31 and 32 mounted thereon are advanced to contact the profile.

The measurement of the deviation from the round shape is effected in a manner analogous to the afore-described one.

The measurement of the distance between the centre 0 of the profile of the section of the shaft 41 (FIG. 9) and the axis $0_1$ of rotation of the shaft is carried out in the following way. During the rotation of the shaft 41 the distance between the portion 49 which is disposed on the base 42 and the centre 0 of the profile of the section of the shaft 41 is stabilized owing to the balance beams 43 and 44 the way it is disclosed in the description of the operation of the device shown in FIGS. 1 – 3. In case the shaft 41 rotates about the axis $0_1$ which does not coincide with the centre 0 of the profile of the section of the shaft 41, this results in a displacement of the base 42 secured to the pantograph 45.

The feeler 48 of the linear movement dial indicator fixes these displacements of the base 42, whereas the indicator 47 shows a double distance between the points 0 and $0_1$.

By having provided this device with two linear-movement indicators, one secured to the base 42 and the other to the frame 46, it becomes possible to measure simultaneously the deviation of the normal section profile of the shaft 41 and the distance between the geometrical centre 0 of the profile and the axis $0 - 0_1$ of revolution of the shaft 41.

The device built in accordance with the present invention provides for a relatively high accuracy of measurements of deviations from the round shape and is very simple in design.

Figure 13:
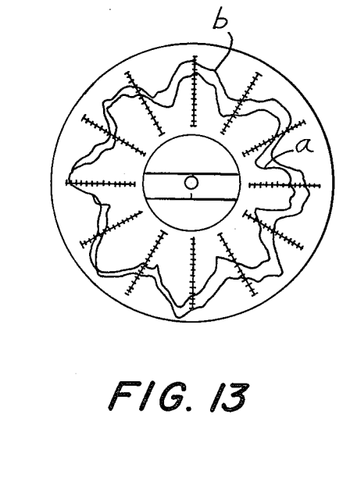
FIG. 13 shows comparative roundgrams obtained with the aid of the present device and the "Talyrond" device.

FIG. 13 shows roundgrams of the same profile of a section of a part, recorded when measuring the deviation from the round shape by means of the device of the present invention, as shown at line "a", and recorded when measuring the deviation with the earlier mentioned aid of the "Talyrond" device manufactured by the firm "Rank Taylor Hobson". As shown at line "b".

Both recordings are increased 10,000 times. The analysis of the roundgrams shows that the actual error of measurements made by our device, as compared to that of the "Talyrond" device, constitutes approximately 0.2 – 0.3 micron, which constitutes approximately 25%.

We claim:

1. A device for measuring the deviation from the round shape of a normal section profile of a part being measured, which has the shape of a body of revolution, comprising: a base; a dial indicator secured to said base and including a sensing element contacting the normal section profile; a support mounted on said base and consisting of self-adjusting balance beams mounted to pivot about respective axles of oscillation arranged in a plurality of support steps including first, subsequent and last steps, so that a pair of said beams forms said first step, the axles of oscillation in said first step are secured to said base, the axles of oscillation of said subsequent steps are secured to the respective ends of the beams of the preceding step, and the beams of said last step have areas for contacting the normal section profile of a normal section of the part in the course of its rotation; the disposition of the axles of oscillation of two beams of a subsequent step on a beam of the preceding step being determined by a central angle defined by radii drawn from the center of rotation of the part to one of the axles of oscillation of said beam of the preceding step and either of the axles of oscillation of the beams of the subsequent step installed thereon; the disposition of the areas adapted to contact the beams of said last step with the profile of the part being determined by central angles defined by radii drawn from said center of rotation of the part to the axle of oscillation of one of the beams of said last step and to the center of one said area; wherein said balance beams are symmetrical relative to planes drawn through their respective axles of oscillation and the center of rotation of the part, and said pairs of beams of the subsequent steps are symmetrical relative to planes drawn through the axles of oscillation of the beams of the respective preceding steps carrying said pairs of beams, and the center of rotation of the part, and said sensing element of the dial indicator contacts the profile of the part in a point on a straight line passing through the center of rotation of the part and parallel with the plane drawn through the axles of oscillation of the beams of said first step, the central angles being determined on the basis of the condition of minimizing the expression $$P_{yn} = \left| \frac{\cos n\mu_0}{\cos \mu_0} \prod_{i=1}^{i=k} \frac{\cos n\mu_i}{\cos \mu_i} \right|,$$

wherein:

$P_{yn}$ is a value determining the amplitude of the harmonic $n$ of displacement of the center of the profile in the direction of the straight line of the part;

$n$ is a serial number of harmonics $n = 2; 3; 4; ...$ ;

$\mu_o$ is a central angle defined by radii drawn from the center of the rotation of the part to the axle of oscillation of one of said beams of the first step and to the median of a segment interconnecting the axles of oscillation of the beams of said first step;

$i$ is a serial number of the step of self-adjusting supports $1 \leq i \leq k$;

$\mu_i$ is a central angle defined by radii drawn through the axles of oscillation of one of the beams of the step $i$ and one of the beams of the step $i+1$, mounted thereon or, with $i=k$, through the center of the area adapted to contact one of the beams of the last step with the part and the axle of oscillation of said one beam of the last step; and $$\prod_{i=1}^{i=k}$$

is a symbol that stands for the product of the cofactors ranging from $i=1$ to $i=k$.

2. A device for measuring the deviation from the round shape of a normal section profile of a part having the shape of a body of revolution, particularly for measuring the distance between the center of the normal section profile and the axis about which the part is mounted to rotate, comprising: a base; a dial indicator secured to said base and including a sensing element contacting the normal section profile of the part being measured; a support mounted on said base, said support consisting of self-adjusting balance beams, each mounted to pivot about an axle of oscillation arranged in a plurality of steps in such a manner that a pair of said beams forms a first step of said support, the axles of oscillation of said beams of the first step are secured to said base, the axles of oscillation of the beams that form subsequent steps of said support are secured to the respective ends of the beams of a preceding step, and the beams of a last step have areas for contacting the normal section profile of a normal section of the part in the course of the rotation; the disposition of the axles of oscillation of each of the two beams of a subsequent step on the associated beam of the preceding step being determined by a central angle defined by radii drawn from the center of rotation of the part to one of the axles of oscillation of one of said beams of the preceding step and either of the axles of oscillation of the beams of the subsequent step installed thereon; the disposition of the areas adapted to contact the beams of said last step with the profile of the part being determined by central angles defined by radii drawn from said center of rotation of the part to the axle of oscillation of one of the beams of said last step and to the center of one said area; wherein said base is suspended by a pantograph and is provided with a flat portion extending parallel to a plane drawn through the axles of oscillation of the beams of the first step; and further comprising an additional dial indicator including an additional sensing element that contacts said flat portion.

* * * * *

UNITED STATES PATENT AND TRADEMARK OFFICE
CERTIFICATE OF CORRECTION

PATENT NO. : 3,942,253
DATED : MARCH 9, 1976
INVENTOR(S) : GEBEL, ET AL

It is certified that error appears in the above–identified patent and that said Letters Patent are hereby corrected as shown below:

Column 9, lines 60-61 change the formula from $$P_{yn} = \left| \frac{\cos n\mu_o}{\cos \mu_o} \prod_{i=1}^{i=k} \frac{\cos n\mu_i}{\cos \mu_i} \right|$$

to $$P_{yn} = \left| \frac{\sin n\mu_o}{\sin \mu_o} \prod_{i=1}^{i=k} \frac{\cos n\mu_i}{\cos \mu_i} \right|$$

Signed and Sealed this

Twenty-seventh Day of December 1977

[SEAL]

Attest:

RUTH C. MASON
Attesting Officer

LUTRELLE F. PARKER
Acting Commissioner of Patents and Trademarks